2,773,059

STEROID α-HALO KETALS

Barney J. Magerlein and A. Vern McIntosh, Jr., Kalamazoo, and Robert H. Levin, Kalamazoo Township, Kalamazoo County, Mich., assignors to The Upjohn Company, Kalamazoo, Mich., a corporation of Michigan No Drawing. Application August 16, 1952,
Serial No. 304,852

21 Claims. (Cl. 260—239.55)

This invention relates to the synthesis of certain steroid cyclic α-halo ketals and is more particularly concerned with the novel 3-monoketals of steroid 4-halo-3,20-diketones having a pregnane carbon skeleton, and to a process for the production thereof.

It is an object of the present invention to provide the novel 3-monoketals of steroid 4-halo-3,20-diketones having a pregnane carbon skeleton. Another object of the present invention is the provision of a process for the production of 3-mono-ketals of steroid 4-halo-3,20-diketones having a pregnane carbon skeleton. Another object of the present invention is to provide a method, through the use of a cyclic ketal, whereby the 3-position of a steroid 4-halo-3,20-diketone having a pregnane carbon skeleton is blocked so that it is non-reactive during further synthesis. A further object of the invention is the provision of a process for the selective hydrolysis of a steroid 4-halo-3,20-diketal having a pregnane carbon skeleton to give a steroid 4-halo-3-monoketal having a pregnane carbon skeleton. Other objects of the present invention will be apparent to one skilled in the art to which this invention pertains.

The novel compounds within the scope of the present invention may be represented by the following basic structural formula:

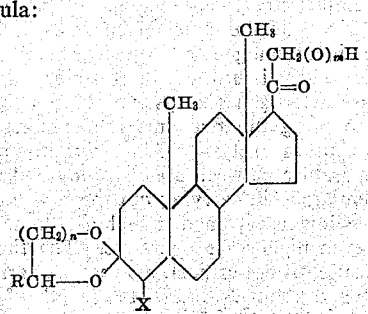

wherein X is a halogen of atomic weight from 35 to 80, i. e., chlorine or bromine, and wherein R is selected from the group consisting of hydrogen and lower-alkyl groups, such as, for example, methyl, ethyl, propyl, isopropyl, butyl, 1-methylpropyl, amyl, hexyl and the like and $n$ is one or two, and $m$ is zero or one. Of these compounds, the lower-alkylene cyclic ketals, formed from 1,2-alkanediols, are preferred.

The pregnane nucleus of the compounds of the present invention may have substituents such as, for example, ketone, hydroxy, acyloxy, carboxy, carbalkoxy, and the like, attached to one or more of the carbon atoms of the pregnane carbon skeleton, such as, for example, in the 6, 7, 11, 12, 17, 21, and other positions. In addition, double bonds may be present in the various positions of the steroid nucleus such as, for example, 6, 7, 8, 9, 11, 14, 15, and other positions. The 4-halo-3-monoketals especially preferred are those wherein the pregnane carbon skeleton has substituents at positions 11, 17, and 21, such as, for example, 4-halo-11β,17α-dihydroxypregnane-3,20-dione 3-monoketals, 4-halo-21-bromo-11β,17α-dihydroxypregnane-3,20-dione 3-monoketals, 4-halo-21-acyloxy-11β,17α-dihydroxypregnane-3,20-dione 3-monoketals, 4-halo-11β,17α,21-trihydroxypregnane-3,20-dione 3-monoketals, and the like. Other steroid 3-monoketals of steroid 4-halo-3,20-diketones having a pregnane carbon skeleton are also included within the scope of the invention, it being understood that the above formula is representative only of the basic structural formula of the compounds of the present invention, and that the invention is not limited solely thereto.

The novel compounds of the present invention are useful in the synthesis of physiologically active steroids such as cortisone, and more particularly of interest in the synthesis of 11β-hydroxysteroids such as Kendall's Compound F and esters thereof. For example, Kendall's Compound F acetate is prepared from a 4-halo-11β,17α-dihydroxy-21-acetoxypregnane-3,20-dione 3-monoketal by treatment with 2,4-dinitrophenylhydrazine in the presence of sulfuric acid, which results in the formation of the 3-(2,4-dinitrophenylhydrazone) and the elimination of hydrogen halide to form a double bond between carbon atoms four and five and give 11β,17α-dihydroxy-21-acetoxy-4-pregnene-3,20-dione 3-(2,4-dinitrophenylhydrazone). Removal of the hydrazone group with pyruvic acid gives Kendall's Compound F acetate. Likewise, free Kendall's Compound F is prepared from a 4-halo-11β,17α,21-trihydroxypregnane-3,20-dione 3-monoketal by treatment with 2,4-dinitrophenylhydrazine in the presence of sulfuric acid followed by removal of the hydrazone group with pyruvic acid. Other compounds of the present invention are similarly useful and undergo the same type of reactions indicated above, as will be apparent to one skilled in the art.

The novel process of the present invention involves the preferential hydrolysis of a steroid 4-halo-3,20-diketal having a pregnane carbon skeleton to give a steroid 4-halo-3-monoketal having a pregnane carbon skeleton. Such a preferential hydrolysis is highly unexpected since it is known that ketal groups are very sensitive to acid hydrolysis and it would be expected, under normal conditions, that both of the ketal groups would be hydrolized. However, it has been found that it is possible preferentially to remove the 20-ketal group of the starting compounds of the present invention while the 3-ketal group remains unchanged. This is apparently due to the fact that the α-halo-ketal moiety of the 4-halo-3-monoketals of the present invention has greater stability than either the halogen or the ketal group alone. This difference in reactivity between the 20-ketal and the α-halo-ketal group is highly important and of considerable commercial significance, lending especial utility to both the products and the process of the present invention. As a result of this unusual stability of the α-halo-ketal group, the 20-ketone group of the compounds of the invention may be subjected to further synthesis such as, for example, introduction of a 21-hydroxy or acyloxy group, removal of the 20-ketal group from the starting compounds for the method of the invention being possible without any effect on the ketal group in the 3-position. The process of the invention is therefore of particular and special utility with 4-halo-3,20-diketals of steroids having an acetyl (—COCH₃) side-chain attached to the steroid nucleus at the 17-position, and of those 4-halo-3,20-diketal steroids having, in addition to the acetyl side-chain, an α-hydroxyl group at the 17-position.

Starting materials for the process of the present invention are steroid 4-halo-3,20-diketals having a pregnane carbon skeleton. In addition to the ketal groups at positions 3 and 20, and the halogen group at position 4, the pregnane carbon skeleton may have other substituents such as, for example, hydroxy, acyloxy, carboxy, carbalkoxy, and the like attached to one or more of the carbon atoms of the pregnane skeleton such as, for example, in the 6, 7, 11, 12, 17, 21, and other positions. Preferred starting materials are steroid 4-halo-3,20-diketals wherein the pregnane carbon skeleton has substituents at positions 11, 17, and 21. Representative starting materials for the process of the present invention include 4-chloropregnane-3,20-dione 3,20-diketals, 4-chloro-17α-hydroxypregnane-3,20-dione 3,20-diketals, 4-chloropregnane-3,11,20-trione 3,20-diketals, 4-chloro-21-hydroxypregnane-3,20-dione 3,20-diketals, 4-chloro-11α-hydroxypregnane-3,20-dione 3,20-diketals, 4-chloro-11β-hydroxypregnane-3,20-dione 3,20-diketals, 4-chloro-17α-hydroxypregnane-3,11,20-trione 3,20-diketals, 4-chloro-11α,17α-dihydroxypregnane-3,20-dione 3,20-diketals, 4-chloro-11β,17α-dihydroxypregnane-3,20-dione 3,20-diketals, 4-chloro-11α-acetoxy-17α-hydroxypregnane-3,20-dione 3,20-diketals, 4-chloro-12,hydroxypregnane-3,20-dione 3,20-diketals, 4-chloro-12-acetoxypregnane-3,20-dione 3,20-diketals, 4-chloro-11-pregnene-3,20-dione 3,20-diketals, 4-chloro-9(11)-pregnene-3,20-dione 3,20-diketals, 4-chloro-6-hydroxypregnane-3,20-dione 3,20-diketals, 4-chloro-6-acetoxypregnane-3,20-dione 3,20-diketals, the corresponding 4-bromo compounds, and the like.

The starting steroid 4-halo-3,20-diketal compound for the method of the present invention are prepared by reacting a steroid 4-halo-3,20-diketone having a pregnane carbon skeleton with an alkane-1,2-diol or an alkane-1,3-diol in the presence of an acid catalyst at a temperature below about 200 degrees centigrade, preferably under reflux conditions, to cause conversion of the 3- and 20-ketone groups to ketal groups. In carrying out the reaction the 4-halo-3,20-diketone compound is admixed with at least the theoretical amount of the alkane-1,2-diol or alkane-1,3-diol in an organic solvent and at a temperature between about twenty and about 200 degrees centigrade, preferably between about twenty and about 150 degrees centigrade. Ordinarily, it is preferred to use an excess of the alkanediol, preferably between about five and about fifty moles per mole of the steroid. The time required for reaction is not critical and may be varied between about one and about 24 hours, the length of time being somewhat dependent on the temperature, the ketalizing reagent and catalyst employed, as will be apparent to one skilled in the art.

The ketalizing reaction can be conducted in any organic solvent with which the reactants and products are non-reactive, such as, for example, benzene, toluene, xylene, methylene chloride, petroleum ether, ether, or the like. However, the preferred solvents are those which form an azeotrope with water and hence remove the water as it is formed in the course of the reaction. For this reason the reaction is usually conducted at the reflux temperature of the mixture, such temperature depending, of course, upon the solvent and the particular reaction conditions, e. g., pressure, employed.

The ketal-forming agents which may be employed in the preparation of the starting diketal compounds are alkane-1,2-diols and alkane-1,3-diols such as, for example, ethylene glycol, propane-1,2-diol, propane-1,3-diol, butane-1,2-diol, pentane-1,2-diol, 3-methylpentane-1,2-diol, hexane-1,3-diol, octane-1,2-diol, and the like. The catalyst may be any suitable acid catalyst and is preferably a mineral acid or an organic sulfonic acid. Representative catalysts are the meta- and para-toluene-sulfonic acids, naphthalenesulfonic acid, benzenesulfonic acid, ortho-chlorobenzenesulfonic acid, hydrochloric acid, and sulfuric acid, with para-toluenesulfonic acid being the preferred acid catalyst.

In addition to the ketalizing method described above for preparing the 3,20-diketal compounds employed as starting materials for the method of the present invention, steroid 4-halo-11β-hydroxy-3,20-diketals may also be prepared by reduction of a steroid 4-halo-11-keto-3,20-diketal. In carrying out the reduction, a reducing agent is admixed with a steroid 4-halo-11-keto 3,20-diketal in the presence of an organic solvent which is non-reactive under the conditions of reaction. Reducing agents such as, for example, lithium aluminum hydride, lithium borohydride, sodium borohydride, hydrogen in the presence of catalysts such as platinum or Raney nickel, and others are operative, with lithium aluminum hydride being preferred. Solvents such as, for example, ether, benzene, tetrahydrofuran, petroleum ether and others are satisfactory. In the preferred embodiment of the process, lithium aluminum hydride is admixed with a suitable organic solvent such as, for example, ether, the steroid is dissolved in a non-reactive solvent such as, for example, benzene, and the admixtures then combined to form the reaction mixture. The temperature of the reaction mixture is usually maintained between about zero and about 100 degrees centigrade, with a temperature between about room temperature and the reflux temperature of the reaction mixture being preferred, for a reaction period varying from about one-half to about eight hours or more, with about two hours being preferred. The ratio of reducing agent to starting steroid may be varied considerably over a wide range, a substantial excess of the reducing agent generally being employed with mole-ratios of up to fifty to one and above being operative. In addition to reduction of the 11-keto group, other reducible groups when present in the molecule may be also reduced by the reducing agent, especially when large excesses of reducing agent are employed.

According to the method of the present invention, a steroid 4-halo-3,20-diketal having a pregnane carbon skeleton is reacted with an acid hydrolyzing agent to cause selective hydrolysis of the 20-ketal group without affecting the 3-ketal group. In carrying out the process of the present invention, the starting steroid 4-halo-3,20-diketal is mixed with an acid hydrolyzing agent. Preferably the starting steroid 4-halo-3,20-diketal is dissolved in an organic solvent and this solution is admixed with at least the theoretical amount, and preferably an excess, of an acid hydrolyzing agent. The organic solvent may be either of the water-miscible type such as, for example, acetone, methanol, ethanol, dioxane, and the like, or the organic solvent may be of the water-immiscible type such as, for example, ether, benzene, chloroform, hexane, and the like. If a water-miscible solvent is used, the reaction takes place in a homogeneous system, whereas, if a water-immiscible solvent is utilized, the reaction mixture forms a two-phase heterogeneous system which must be stirred in order to bring the reactants into contact with each other and cause hydrolysis. Ordinarily, it is preferred to use a temperature between about twenty and about forty degrees centigrade in carrying out the reaction, but temperatures as low as zero and as high as 100 degrees centigrade or even higher are operative. The time required for the reaction is not critical and may be varied between about one and about 24 hours, the length of time being dependent on the temperature and the hydrolyzing agent employed. The amount of hydrolyzing agent employed may be varied over a wide range since the acid acts as a catalyst for the reaction. Amounts from a trace to large excess of the hydrolyzing agent are operative. The acid hydrolyzing agent for the process of the present invention is a strong acid such as, for example, sulfuric acid, hydrochloric acid, meta- or para-toluenesulfonic acids, naphthalenesulfonic acid, benzenesulfonic acid, ortho-chlorobenzenesulfonic acid, trichloroacetic acid, or the like, with sulfuric acid and hydrochloric acid being the preferred acids. The acid hydrolyzing agent is generally employed as a dilute aqueous solution, and in dilute concentrations. Acid concentrations in the reaction mixture of about 0.1 per cent to about twenty per cent are preferably employed but lower and higher concentrations are operative. Under these reaction conditions the α-haloketal group is stable and remains unaffected while hydrolysis of the 20-ketal takes place.

When hydrolysis is substantially complete, the product is isolated by conventional procedure, for example, when the resulting mixture is composed of an organic layer and a water layer, the organic layer is separated, the water layer is extracted with ether, and the organic solutions are combined. The combined extracts are then washed with water and dried using a drying agent such as anhydrous sodium sulfate. Filtration to remove the drying agent and distillation to remove the solvent gives the isolated product, which may be crystallized from any of the common organic solvents. Alternatively, the product may be isolated by diluting the reaction mixture with water until crystallization of the product takes place. If desired, chromatographic purification may be employed.

The preferred starting 4-halo-3,20-diketals are those of steroids having an acetyl (—COCH$_3$) side-chain attached to the steroid nucleus at the 17-position. Also preferred are 4-halo-3,20-diketals of steroids having, in addition to the acetyl side-chain, an $\alpha$-hydroxy group at the 17-position. The presence of carboxylic acid ester or acyloxy groups in the starting material is not to be considered undesirable since, under the conditions of the reaction, hydrolysis of such ester groups does not take place to any appreciable extent. Furthermore, if hydrolysis does take place, the ester groups are easily reestablished by esterification.

The following examples are illustrative of the process and products of the present invention but are not to be construed as limiting.

PREPARATION 1.—4-CHLORO-17$\alpha$-HYDROXYPREGNANE-3,11,20-TRIONE

A solution of 25 grams of 3$\alpha$,17$\alpha$-dihydroxypregnane-11,20-dione [Sarett, J. Am. Chem. Soc., 70, 1454 (1948)] in 380 milliliters of tertiary-butyl alcohol was admixed with five milliliters of concentrated hydrochloric acid and twelve milliliters of water, and thereafter cooled to about fifteen degrees centigrade. Eighteen milliliters (2.2 molar equivalents) of tertiary-butyl hypochlorite was then added thereto, whereupon the temperature rose to about 26 degrees centigrade. The reaction mixture was stirred for 4.5 hours although the iodometric titration of an aliquot sample taken from the reaction mixture after two hours showed the reaction to be essentially complete. The volatile components of the reaction mixture were removed by distillation at reduced pressure leaving a 24.59 gram residue (a yield of 90.6 per cent of the theoretical, corrected for the samples taken from the reaction mixture for iodometric titrations) of 4-chloro-17$\alpha$-hydroxypregnane-3,11,20-trione, melting without purification at 220 to 225 degrees centigrade and having an $[\alpha]_D$ of plus 91 degrees (acetone).

The corresponding 4-bromo compound is prepared according to the procedure of Kritchevsky, et al. [J. Am. Chem. Soc., 74, 483 (1952)].

PREPARATION 2.—4-CHLORO-17$\alpha$-HYDROXYPREGNANE-3,11,20-TRIONE 3,20-ETHYLENE GLYCOL DIKETAL A solution of five grams of 4-chloro-17$\alpha$-hydroxypregnane-3,11,20-trione (from Preparation 1), ten milliliters of ethylene glycol, 0.30 gram of para-toluenesulfonic acid monohydrate and 500 milliliters of benzene was placed in a reaction flask which was equipped with a reflux condenser and a water trap so arranged that the condensed vapors passed through the water trap before returning to the reaction flask. The mixture was heated to reflux and was allowed to reflux for six hours while at the same time being agitated. The water which formed was removed by co-distillation with benzene and was collected in the water trap. The reaction mixture was cooled, washed with a dilute solution of sodium bicarbonate and with water, and then dried and concentrated to dryness under reduced pressure. The white crystalline residue was dissolved in 85 milliliters of ethyl acetate and the solution was cooled until crystallization took place. The crystalline 4-chloro-17$\alpha$-hydroxypregnane-3,11,20-trione 3,20-ethylene glycol diketal was isolated by filtration and weighed 1.986 grams; melting point 232 to 236 degrees centigrade. A second crop of 1.928 grams, melting point 232 to 235 degrees centigrade, was obtained by concentration of the mother liquor. The two crops were combined and recrystallized from methylene chloride-hexane, benzene, and ethyl acetate, in that order, to yield purified product of melting point 239 to 242 degrees centigrade; $[\alpha]_D^{23}$ plus 55 degrees (acetone).

*Analysis.*—Calculated for $C_{25}H_{37}O_6Cl$: C, 64.02; H, 7.95; Cl, 7.56. Found: C, 64.57; H, 7.86; Cl, 7.55.

PREPARATION 3.—4-CHLORO-11$\beta$,17$\alpha$-DIHYDROXYPREGNANE-3,20-DIONE 3,20-ETHYLENE GLYCOL DIKETAL To a solution of thirteen grams of lithium aluminum hydride in one liter of anhydrous ether was added, with stirring, a solution of 13.79 grams of 4-chloro-17$\alpha$-hydroxypregnane-3,11,20-trione 3,20-ethylene glycol diketal (from Preparation 2) in 200 milliliters of benzene. The reaction mixture was stirred at room temperature for one hour and was then heated at reflux for an additional hour. After cooling, the mixture was hydrolyzed by the cautious addition of a solution of 100 milliliters of hydrochloric acid in 150 milliliters of water. Stirring at room temperature was continued for several hours, after which the organic layer was separated and the water layer was extracted with methylene chloride. The methylene chloride extract was combined with the organic layer and the whole was washed with water and dilute sodium bicarbonate solution, dried and evaporated to dryness. The residue was triturated with ether and yielded 8.38 grams of 4-chloro-11$\beta$,17$\alpha$-dihydroxypregnane-3,20-dione 3,20-ethylene glycol diketal; melting point 212 to 218 degrees centigrade. An additional 1.51 grams was obtained from the ether mother liquor. Several recrystallizations from a mixture of ethyl acetate-hexane gave purified material melting at 222 to 224 degrees centigrade.

*Analysis.*—Calculated for $C_{25}H_{39}O_6Cl$: C, 63.74; H, 8.35; Cl, 7.53. Found: C, 63.80; H, 8.30; Cl, 7.35.

*Example 1.—4-chloro-11$\beta$,17$\alpha$-dihydroxypregnane-3,20-dione 3-ethylene glycol ketal*

A solution of one gram of 4-chloro-11$\beta$,17$\alpha$-dihydroxypregnane-3,20-dione 3,20-ethylene glycol diketal (from Preparation 3) in fifty milliliters of acetone containing ten milliliters of water and 0.1 milliliters of sulfuric acid was permitted to stand at room temperature for two hours. The solution was then concentrated under a stream of air, diluted with water, and extracted with ethylene dichloride. The ethylene dichloride extract, after drying, was chromatographed over eighty grams of Florisil (magnesium silicate). The chromatograph was eluted with eighty-milliliter fractions of solvent as indicated below.

| Fraction No. | Solvent | Residue (Weight, mg.) |
|---|---|---|
| 1–3 | ethylene dichloride | 5 |
| 4 | ethylene dichloride plus 4% acetone | 17 |
| 5 | do | 122 |
| 6 | do | 180 |
| 7 | ethylene dichloride plus 6% acetone | 286 |
| 8 | do | 130 |
| 9 | do | 39 |
| 10 | do | 17 |
| 11–14 | ethylene dichloride plus 9% acetone | 17 |
| 15 | ethylene dichloride plus 20% acetone | 20 |
| 16 | do | 12 |
| 17–20 | do | 9 |

Fractions 4–8 (708 milligrams) were combined and recrystallized from ethyl acetate-hexane to give 560 milligrams of 4-chloro-11$\beta$,17$\alpha$-dihydroxypregnane-3,20-dione 3-ethylene glycol ketal; melting point 183 to 185 degrees centigrade. Further recrystallization from ethyl acetate-hexane resulted in purer product of melting point 194 to 196 degrees centigrade (with decomposition); $[\alpha]_D^{23}$ plus 82 degrees (acetone).

*Analysis.*—Calculated for $C_{23}H_{35}O_5Cl$: C, 64.70; H, 8.26. Found: C, 64.57; H, 8.13.

Example 2.—4 - chloro - 11β,17α - dihydroxypregnane-3,20-dione 3-ethylene glycol ketal A mixture of 500 milligrams of 4-chloro-11β,17α-dihydroxypregnane - 3,20 - dione 3,20 - ethylene glycol diketal (from Preparation 3) in 25 milliliters of ether, fifteen milliliters of water, and fifteen milliliters of concentrated hydrochloric acid, was stirred at room temperature for sixteen hours. The ether phase was separated, the water phase was extracted two times with ether, and the ether extracts were combined with the main ether phase. The combined ether solution was then concentrated to a small volume whereupon crystallization took place. The yield of 4-chloro-11β,17α-dihydroxypregnane-3,20 - dione 3 - ethylene glycol ketal was 300 milligrams of melting point 174 to 192 degrees centigrade. Recrystallization from ethyl acetate-hexane gave 210 milligrams of purified material of melting point 194 to 196 degrees centigrade.

Example 3.—4 - bromo - 11β,17α - dihydroxypregnane-3,20 - dione 3 - ethylene glycol ketal Following the procedure of Example 1 or 2, 4-bromo-11β,17α - dihydroxypregnane - 3,20 - dione 3,20-ethylene glycol diketal (prepared from 4 - bromo - 17α - hydroxypregnane - 3,11,20 - trione according to the procedures of Preparation 2 or 3) is hydrolyzed to give 4-bromo-11β,17α - dihydroxypregnane - 3,20-dione 3 - ethylene glycol ketal.

Example 4.—4 - chloro - 21 - bromo - 11β,17α - dihydroxypregnane - 3,20 - dione 3 - ethylene glycol ketal Four hundred milligrams of 4 - chloro - 11β,17α-dihydroxypregnane - 3,20 - dione 3 - ethylene glycol ketal (from Example 1) was dissolved in fifteen milliliters of chloroform and a total of 3.2 milliliters of bromine in acetic acid was added dropwise and at such a rate as to permit decolorization of each drop before the subsequent drop was added. The solution was then diluted with ether, washed with a cold dilute solution of sodium bicarbonate, and with water, and dried. Removal of the solvent gave 320 milligrams of 4 - chloro - 21 - bromo-11β,17α - dihydroxypregnane - 3,20 - dione 3 - ethylene glycol ketal; melting point 199 to 201 degrees centigrade (with decomposition). Infrared analysis confirmed the structure proposed.

Analysis.—Calculated for $C_{23}H_{35}O_5BrCl$: Total Halogen, 22.76. Found: Total Halogen, 21.75.

The corresponding 4-bromo compound is prepared from 4 - bromo - 11β,17α - dihydroxypregnane - 3, 20-dione 3 - ethylene glycol ketal by following the procedure of the above example.

Example 5.—4 - chloro - 11β,17α - dihydroxy - 21-acetoxypregnane-3,20-dione 3-ethylene glycol ketal A mixture of 1.77 grams (0.0035 mole) of 4 - chloro-11β,17α - dihydroxy - 21 - bromopregnane - 3,20 - dione 3 - ethylene glycol ketal (from Example 3), two grams of potassium acetate, fifty milligrams of potassium iodide, and 0.5 milliliter of acetic acid in 300 milliliters of acetone was heated under reflux for sixteen hours. The mixture was filtered and the filtrate was concentrated to dryness under reduced pressure. The residue was dissolved in ethyl acetate, filtered to remove inorganic salts, and was allowed to crystallize. The yield of 4 - chloro - 11β, 17α - dihydroxy - 21 - acetoxypregnane - 3,20 - dione 3 - ethylene glycol ketal was 1.39 grams (84.8 percent); melting point 231 to 234 degrees centigrade. Recrystallization from the same solvent raised the melting point to 232 to 233 degrees centigrade.

Analysis.—Calculated for $C_{25}H_{37}O_7Cl$: C, 61.91; H, 7.69; Cl, 7.31. Found: C, 62.17; H, 7.73; Cl, 7.16.

Following the same procedure as above, other acyloxy groups may be substituted in the 21 - position by reaction of 4 - chloro - 21 - bromo - 11β,17α - dihydroxypregnane-3,20 - dione 3 - ethylene glycol ketal with the appropriate acylating agent. Such acyloxy groups include propionoxy, butyroyloxy, valeroyloxy, hexanoyloxy, heptanoyloxy, octanoyloxy, benzoyloxy, and others. The preferred acyloxy groups are those derived from a hydrocarbon monocarboxylic acid containing from one to eight carbon atoms, inclusive.

In addition, the corresponding 4 - bromo compounds are similarly prepared from 4 - bromo - 11β,17α - dihydroxy - 21 - bromopregnane - 3,20 - dione 3 - ethylene glycol ketal according to the procedure of the above example.

Example 6.—4 - chloro - 11β,17α,21-trihydroxypregnane-3,20 - dione 3 - ethylene glycol ketal A solution of 100 milligrams of 4 - chloro 11β,17α-dihydroxy - 21 - bromopregnane - 3,20 - dione 3 - ethylene glycol ketal (from Example 4) in fifty milliliters of alcohol and fifty milliliters of 0.1 N sodium hydroxide was permitted to stand at 25 degrees centigrade under nitrogen for ten minutes. The pH was adjusted to seven with dilute hydrochloric acid and the solution was then diluted with 200 milliliters of water and repeatedly extracted with ether. The ether extract was evaporated to dryness and the residue was purified by chromatography over Florisil to yield ten milligrams of 4 - chloro - 11β,17α,21 - trihydroxypregnane - 3,20 - dione 3 - ethylene glycol ketal. The structure of this compound, which was not crystalline, was confirmed by infrared analysis.

The corresponding 4 - bromo compound is prepared from 4 - bromo - 11β,17α - dihydroxy - 21 - bromopregnane - 3,20 - dione 3 - ethylene glycol ketal by following the procedure of the above example.

Example 7.—4 - chloro - 17α - hydroxypregnane - 3,11, 20 - trione 3 - ethylene glycol ketal A solution of 100 milligrams of 4 - chloro - 17α - hydroxypregnane - 3,11,20 - trione 3,20 - ethylene glycol diketal (from Preparation 2), four milliliters of water, and a drop of concentrated sulfuric acid, in ten milliliters of acetone was allowed to stand at room temperature for 24 hours. The solution was then diluted with water until crystallization took place. The crystalline material was isolated by filtration and was recrystallized from methylene chloride-hexane to yield purified 4 - chloro-17α - hydroxypregnane - 3,11,20 - trione 3 - ethylene glycol ketal (87 percent); melting point 194 to 203 degrees centigrade; $[\alpha]_D^{25}$ plus 83 degrees (acetone).

Analysis.—Calculated for $C_{23}H_{33}O_5Cl$: C, 65.00; H, 7.82; Cl, 8.34. Found: C, 65.16; H, 7.90; Cl, 8.37.

The corresponding 4-bromo compound is prepared from 4-bromo-17α-hydroxypregnane-3,11,20-trione 3,20-ethylene glycol diketal by following the procedure of the above example.

Example 8. — 4-chloro-17α-hydroxy-21-acetoxypregnane-3,11,20-trione 3-ethylene glycol ketal This compound can be prepared from 4-chloro-17α-hydroxypregnane-3,11,20-trione 3-ethylene glycol ketal of Example 6, by bromination at the 21-position according to the procedure of Example 3, followed by replacement of the bromine with an acetate group according to the procedure of Example 4. The product, 4-chloro-17α-hydroxy - 21 - acetoxypregnane-3,11,20 - trione 3-ethylene glycol ketal, is crystallized from isopropyl alcohol and melts at 228–232 degrees centigrade.

Analysis.—Calculated for $C_{23}H_{31}O_6Cl$: C, 62.93; H, 7.12; Cl, 8.08. Found: C, 62.46; H, 7.48; Cl. 7.60.

In the same manner as given in the above examples, starting from the appropriate 3,20-diketal, other steroid 4-halo-3-mono-ketals are prepared, including 4-chloropregnane-3,20-dione 3-propane-1,3-diol monoketal, 4-chloropregnane-3,20-dione 3-octane-1,3-diol monoketal, 4-chloropregnane-3,20-dione 3-butane-1,2-diol monoketal, 4 - chloro - 17α - hydroxypregnane - 3,20-dione 3-ethylene glycol monoketal, 4-chloro-17α-hydroxypregnane-3,20- dione 3-propane-1,2-diol monoketal, 4-chloro-17α-hydroxypregnane-3,20-dione 3-pentane-1,2-diol monoketal, 4-chloropregnane-3,11,20-trione 3-ethylene glycol monoketal, 4-chloropregnane-3,11,20-trione 3-butane-1,3-diol monoketal, 4-chloro-21-hydroxypregnane-3,20-dione 3-ethylene glycol monoketal, 4-chloro-11α-hydroxypregnane-3,20-dione 3-ethylene glycol monoketal, 4-chloro-11α-hydroxypregnane-3,20-dione-3-hexane-1,2-diol monoketal, 4-chloro-11β-hydroxypregnane-3,20-dione 3-ethylene glycol monoketal, 4 - chloro - 11α,17α,- dihydroxypregnane-3,20-dione 3-propane-1,2-diol monoketal, 4-chloro-11α,17α-dihydroxypregnane-3,20-dione 3-propane-1,3-diol monoketal, 4-chloro-11α,17α-dihydroxypregnane-3,20-dione 3-butane-1,2-diol monoketal, 4-chloro-11α-acetoxy-17α-hydroxypregnane-3,20-dione 3-ethylene glycol monoketal, 4-chloro-11α-acetoxy-17α-hydroxypregnane-3,20-dione 3-butane-1,3-diol monoketal, 4-chloro-12-acetoxypregnane-3,20-dione 3-butane-1,3-diol monoketal, 4-chloro-12-acetoxypregnane-3,20-dione 3-ethylene glycol monoketal, 4-chloro-6-acetoxypregnane-3,20-dione 3-ethylene glycol monoketal, 4-chloro-11-pregnene-3,20-dione 3-ethylene glycol monoketal, 4-chloro-9(11)-pregnene-3,20-dione 3-ethylene glycol monoketal, the corresponding 4-bromo monoketals, and the like.

As stated in the foregoing, the compounds of the present invention are useful in the preparation of physiologically active hormones such as, for example, Kendall's Compound F and acylates thereof.

Compound F acylates are prepared by first treating a 4-halo-11β,17α-dihydroxy-21-acyloxypregnane-3,20-dione 3-monoketal (Example 5) with an acid in the presence of a nitrogen carbonyl reagent such as, for example, semicarbazide, hydrazine, phenyl-hydrazine, 2,4-dinitrophenyl-hydrazine, hydroxylamine, and the like, to cause in a single step (1) removal of the ketal group, (2) formation of a ketonic nitrogen derivative at the 3-position, and (3) dehydrohalogenation at the 4(5)-position. The 4(5)-unsaturated ketonic nitrogen derivative thus-formed, with or without isolation, is then reacted with an exchange reagent capable of entering into an exchange reaction to form a ketonic nitrogen derivative of the exchange reagent and free the 3-keto group of the steroid and yield Compound F acylate. Representative exchange reagents are pyruvic acid, 2-ketogluconic acid, glucuronic acid, para-hydroxybenzaldehyde, ortho-hydroxybenzaldehyde, salicylaldehyde, ethylacetoacetate, and the like. Similarly, free Compound F is prepared from a 4-halo-11β,17α,21-trihydroxypregnane-3,20-dione 3-monoketal by treatment with an acid in the presence of nitrogen carbonyl reagent, followed by reaction with a ketonic nitrogen derivative exchange reagent.

*Example A.—Kendall's Compound F acetate*

A solution of 440 milligrams of 2,4-dinitrophenylhydrazine in three milliliters of acetic acid and three milliliters of water containing 0.2 milliliters of sulfuric acid was prepared by warming the ingredients to about seventy to eighty degrees centigrade. This solution was added to a suspension of 4-chloro-11β,17α-dihydroxy-21-acetoxypregnane-3,20-dione 3-ethylene glycol ketal in five milliliters of acetic acid and in the presence of an atmosphere of nitrogen which was maintained throughout the reaction. The mixture was heated at seventy degree centigrade for 0.5 hours and was then permitted to stand at room temperature for two hours. Red needles of unsaturated hydrazone crystallized on standing and were redissolved by the addition of ten milliliters of acetic acid and ten milliliters of chloroform. One milliliter of pyruvic acid was added and the reaction mixture heated at fifty degrees centigrade for two hours, after which, two grams of sodium acetate was added and the solution stirred for five minutes. After removal of the solvent under reduced pressure, the residue was triturated three times with chloroform and filtered to remove the insoluble sodium salt of the 2,4-dinitrophenylhydrazone of pyruvic acid. The chloroform solution was washed successively with water, dilute sodium bicarbonate solution, water, and was then dried over sodium sulfate and concentrated to dryness.

For ease of isolation and in order to compensate for any hydrolysis that might have occurred during the reaction, the residue was reacetylated with a mixture of two milliliters of acetic anhydride and two milliliters of pyridine at 26 degrees centigrade for one hour. The excess acetic anhydride was destroyed by the addition of water and the product was extracted with methylene dichloride. The methylene dichloride solution was washed successively with dilute hydrochloric acid, water, dilute sodium bicarbonate solution, water, and was then dried over sodium sulfate and concentrated to dryness. The residue was crystallized from acetone and gave, in two crops, 560 milligrams (71.1 percent) of crude crystalline Compound F acetate. The crude crystalline product was recrystallized from fifty milliliters of methanol, after treatment with a decolorizing agent (Darco G-60), to yield 410 milligrams (51.8 percent) of purified Compound F acetate; melting point 208 to 211 degrees centigrade.

*Example B.—Kendall's Compound F acetate*

Under an atmosphere of nitrogen, a mixture of one gram of 4-chloro-11β, 17α-dihydroxy-21-acetoxypregnane-3,20-dione 3-ethylene glycol ketal, thirty milliliters of acetic acid, six milliliters of water, and 72 milligrams of semicarbazide hydrochloride were heated at seventy degrees centigrade for five hours, after which the solvent was removed by distillation under reduced pressure. The residue was partially dissolved in a mixture of water and ethyl acetate giving 190 milligrams of insoluble material which was isolated by filtration. The organic layer was separated, washed, and evaporated to dryness to give 807 milligrams of an oil. Both the solid material and oil were combined and dissolved in a mixture of twenty milliliters of dioxane, five milliliters of water, two milliliters of pyruvic acid and five drops of acetic acid. This mixture was then heated at 65 degrees centigrade for 1.5 hours, after which the solvent was distilled under reduced pressure and the residue was dissolved in methylene dichloride. After washing and drying, the methylene dichloride solution was evaporated to dryness and the residue was reacetylated with a mixture of three milliliters of pyridine and two milliliters of acetic anhydride. The reacetylated material was worked up as in Example A to give 680 milligrams of crude crystalline Compound F acetate.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the production of a steroid 4-halo-3,20-dione 3-cyclic monoketal which comprises: mixing together an acid hydrolyzing agent and a steroid 4-halo-3,20-dione, 3,20-cyclic diketal having the following basic general formula:

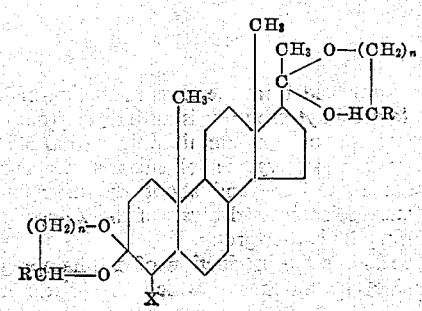

wherein R is selected from the class consisting of hydrogen and a lower-alkyl group, n is an integer from one to two, and X is a halogen of atomic weight from 35 to 80, to cause selective hydrolysis of the 20-cyclic ketal group to form a 20-ketone group.

2. A process for the production of a 4-halopregnane-3,20-dione 3-cyclic monoketal which comprises: mixing together an acid hydrolyzing agent and a 4-halopregnane-3,20-dione 3,20-cyclic diketal, wherein the halogen is of atomic weight from 35 to 80, at a temperature between about zero and about 100 degrees centigrade, to cause selective hydrolysis of the 20-cyclic ketal group to form a 20-ketone group.

3. A process for the production of a 4-halopregnane-3,20-dione 3-cyclic monoketal which comprises: mixing together an acid hydrolyzing agent selected from the group consisting of organic sulfonic acids and mineral acids, and a 4-halopregnane-3,20-dione 3,20-cyclic diketal according to claim 1, at a temperature between about zero and about 100 degrees centigrade, to cause selective hydrolysis of the 20-cyclic ketal group to form a 20-ketone group.

4. A process for the production of a 4-halopregnane-3,20-dione 3-cyclic monoketal which comprises: mixing together an acid hydrolyzing agent selected from the group consisting of organic sulfonic acids and mineral acids, and a 4-halopregnane-3,20-dione 3,20-cyclic diketal according to claim 1, in the presence of an organic solvent, and at a temperature of about zero to about 100 degrees centigrade, to cause selective hydrolysis of the 20-cyclic ketal group to form a 20-ketone group.

5. A process for the production of a 4-halopregnane-3,20-dione 3-cyclic monoketal which comprises: mixing a mineral acid and a 4-halopregnane-3,20-dione 3,20-cyclic diketal according to claim 1, in the presence of an organic solvent, and at a temperature of about zero to about 100 degrees centigrade, to cause selective hydrolysis of the 20-cyclic ketal group to form a 20-ketone group.

6. A process for the production of a 4-halopregnane-3,20-dione 3-cyclic monoketal which comprises: mixing a mineral acid and a 4-halopregnane-3,20-dione 3,20-cyclic diketal according to claim 1, in the presence of a water-immiscible organic solvent, and at a temperature of about zero to about 100 degrees centigrade, to cause selective hydrolysis of the 20-cyclic ketal group to form a 20-ketone group.

7. A process for the production of a 4-halopregnane-3,20-dione 3-cyclic monoketal which comprises: mixing together a mineral acid and a steroid 4-halo-3,20-dione 3,20-cyclic diketal having the following basic general formula:

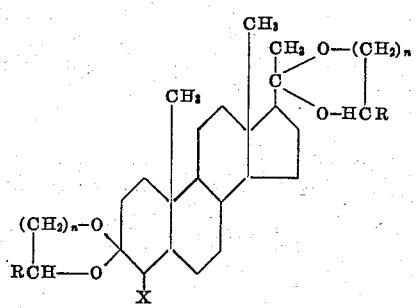

wherein R is selected from the class consisting of hydrogen and a lower-alkyl group, n is an integer from one to two, and X is a halogen of atomic weight from 35 to 80, in the presence of an organic solvent and at a temperature between about zero and about 100 degrees centigrade, to cause selective hydrolysis of the 20-cyclic ketal group to form a 20-ketone group.

8. A process for the production of a 4-halopregnane-3,20-dione 3-cyclic monoketal which comprises: mixing together a mineral acid and a steroid 4-halo-3,20-dione 3,20-cyclic diketal having the basic general formula:

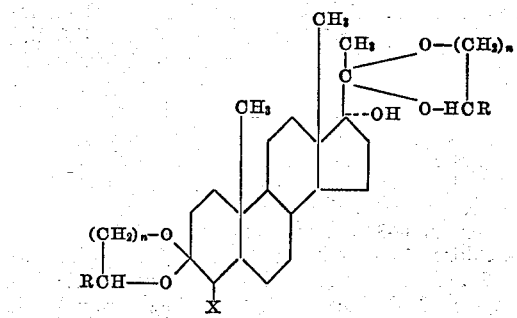

wherein R is selected from the class consisting of hydrogen and a lower-alkyl group, n is an integer from one to two, and X is a halogen of atomic weight from 35 to 80, in the presence of an organic solvent and at a temperature between about zero and about 100 degrees centigrade, to cause selective hydrolysis of the 20-cyclic ketal group to form a 20-ketone group.

9. A process for the production of 4-halo-11β,17α-dihydroxypregnane-3,20-dione 3-ethylene glycol monoketal which comprises: mixing together a mineral acid and 4-halo-11β,17α-dihydroxypregnane-3,20-dione 3,20-ethylene glycol diketal, wherein the halogen is of atomic weight from 35 to 80, in an organic solvent and at a temperature between about zero and about 100 degrees centigrade, to cause selective hydrolysis of the 20-cyclic ketal group to form a 20-ketone group.

10. A process for the production of 4-halo-17α-hydroxypregnane-3,11,20-trione 3-ethylene glycol monoketal which comprises: mixing together a mineral acid and 4-halo-17α-hydroxypregnane-3,11,20-trione 3,20-ethylene glycol diketal, wherein the halogen is of atomic weight from 35 to 80, in an organic solvent and at a temperature between about zero and about 100 degrees centigrade, to cause selective hydrolysis of the 20-cyclic ketal group to form a 20-ketone group.

11. A process for the production of 4-chloro-11β,17α-dihydroxypregnane-3,20-dione 3-ethylene glycol monoketal which comprises: mixing together a mineral acid and 4-chloro-11β,17α-dihydroxypregnane-3,20-dione 3,20-ethylene glycol diketal in an organic solvent and at a temperature between about zero and about 100 degrees centigrade, to cause selective hydrolysis of the 20-cyclic ketal group to form a 20-ketone group.

12. A process for the production of 4-chloro-17α-hydroxypregnane-3,11,20-trione 3-ethylene glycol monoketal which comprises: mixing together sulfuric acid and 4-chloro-17α-hydroxypregnane-3,11,20-trione 3,20-ethylene glycol diketal, in an organic solvent and at a temperature between about zero and about 100 degrees centigrade, to cause selective hydrolysis of the 20-cyclic ketal group to form a 20-ketone group.

13. A process for the production of a steroid 4-halo-11β-hydroxy-pregnane-3,20-dione 3-cyclic monoketal which includes the steps of (1) mixing together a steroid 4-halo-3,11,20-trione having the following basic general formula:

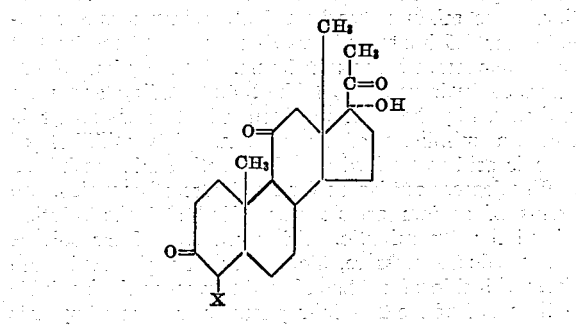

wherein X is a halogen of atomic weight from 35 to eighty, and a ketal-forming agent selected from the group consisting of alkane-1,2-diols and alkane-1,3-diols containing from two to eight carbon atoms, inclusive, in the presence of an acid catalyst to produce a steroid 4-halo-3,11,20-trione 3,20-alkanediol diketal, (2) reacting the thus-produced 3,20-alkanediol diketal with a reducing agent to convert the 11-ketone group to an 11β-hydroxy group, and (3) hydrolyzing the thus-produced 11β-hydroxy-3,20-alkanediol diketal to cause selective hydrolysis of the 20-cyclic ketal group to form a 20-ketone group.

14. A process for the production of 4-chloro-11β,17α-dihydroxypregnane-3,20-dione 3-ethylene glycol ketal which includes the steps of (1) mixing together 4-chloro-17α-hydroxypregnane-3,11,20-trione and ethylene glycol in the presence of para-toluenesulfonic acid to produce 4-chloro-17α-hydroxypregnane-3,11,20-trione 3,20-ethylene glycol diketal, (2) reacting the thus-produced 4-chloro-17α-hydroxypregnane-3,11,20-trione 3,20-ethylene glycol diketal with lithium aluminum hydride, in an organic solvent which is non-reactive under the conditions of the reaction, to produce 4-chloro-11β,17α-dihydroxypregnane-3,20-dione 3,20-ethylene glycol diketal, and (3) reacting the thus-produced 4-chloro-11β,17α-dihydroxypregnane-3,20-dione 3,20-ethylene glycol diketal with a mineral acid, in an organic solvent, and at a temperature between about zero and about 100 degrees centigrade, to cause selective hydrolysis of the 20-cyclic ketal group to form a 20-ketone group.

15. 4-halo-11β,17α-dihydroxypregnane-3,20-dione 3-ethylene glycol monoketals, wherein the halogen is of atomic weight from 35 to 80, which may be represented by the formula

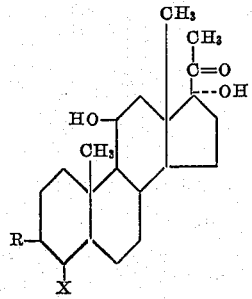

wherein R is an ethylene glycol ketal group and X is halogen as defined above.

16. 4 - halo - 21 - bromo-11β,17α-dihydroxypregnane-3,20-dione 3-ethylene glycol monoketals, wherein the halogen is of atomic weight from 35 to 80, which may be represented by the formula

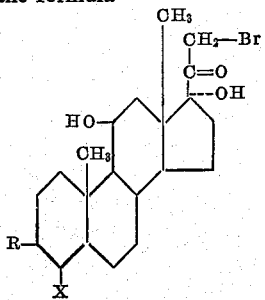

wherein R is an ethylene glycol ketal group and X is halogen as defined above.

17. 4 - halo - 17α - hydroxypregnane-3,11,20-trione 3-ethylene glycol monoketals, wherein the halogen is of atomic weight from 35 to 80, which may be represented by the formula

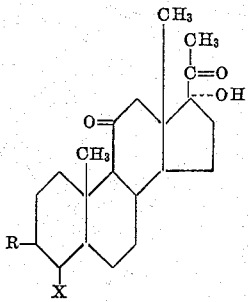

wherein R is an ethylene glycol ketal group and X is halogen as defined above.

18. 4 - chloro - 11β,17α-dihydroxypregnane-3,20-dione 3-ethylene glycol monoketal.

19. 4 - chloro-21 - bromo-11β,17α-dihydroxypregnane-3,20-dione 3-ethylene glycol monoketal.

20. 4 - chloro - 17α-hydroxypregnane-3,11,20-trione 3-ethylene glycol monoketal.

21. A steroid 4-halo-3,20-dione 3-cyclic monoketal having the following general formula:

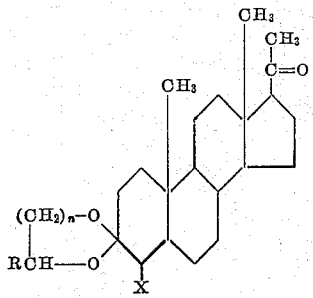

wherein X is a halogen of atomic weight from 35 to eighty, R is a member of the group consisting of hydrogen and lower-alkyl, and n is an integer from one to two, and wherein the 11-position is substituted by a radical selected from the group consisting of α-hydroxy, β-hydroxy and keto, and the 17-position is substituted by a member of the group consisting of hydrogen and α-hydroxy.

References Cited in the file of this patent

UNITED STATES PATENTS

| | | |
|---|---|---|
| 2,153,700 | Serini | Apr. 11, 1939 |
| 2,256,500 | Serini | Sept. 23, 1941 |
| 2,288,854 | Stavely | July 7, 1942 |
| 2,302,636 | Koster | Nov. 17, 1942 |
| 2,356,154 | Fernholz | Aug. 22, 1944 |
| 2,510,940 | Sarett | June 13, 1950 |
| 2,541,104 | Sarett | Feb. 13, 1951 |
| 2,541,105 | Sarett | Feb. 13, 1951 |

FOREIGN PATENTS

| | | |
|---|---|---|
| 236,520 | Switzerland | 1945 |

OTHER REFERENCES

Antonucci: J. Org. Chem., vol. 17, No. 10, received Apr. 14, 1952, pp. 1369–74.